(12) United States Patent
Tai et al.

(10) Patent No.: US 7,002,634 B2
(45) Date of Patent: Feb. 21, 2006

(54) APPARATUS AND METHOD FOR GENERATING CLOCK SIGNAL

(75) Inventors: Chia-Liang Tai, Taipei (TW); Yi-Chieh Huang, Taipei (TW); Chuan-Chen Lee, Hsinchu (TW)

(73) Assignee: Via Technologies, Inc., Shindian (TW)

( * ) Notice: Subject to any disclaimer, the term of this patent is extended or adjusted under 35 U.S.C. 154(b) by 597 days.

(21) Appl. No.: 10/196,621

(22) Filed: Jul. 16, 2002

(65) Prior Publication Data

US 2003/0112371 A1 Jun. 19, 2003

(30) Foreign Application Priority Data

Jan. 25, 2002 (TW) ............................... 91101208 A

(51) Int. Cl.
*H04N 5/06* (2006.01)
(52) U.S. Cl. ...................... 348/537; 348/524; 348/536; 348/521
(58) Field of Classification Search ............... 375/355, 375/371, 375, 376; 348/521, 524, 537, 536, 348/546, 548, 544; 327/146, 147, 150, 298, 327/299, 244, 241, 151; 331/1 R, 11, 177 R
See application file for complete search history.

(56) References Cited

U.S. PATENT DOCUMENTS

| 4,906,944 | A | * | 3/1990 | Frerking | ..................... 331/1 A |
| 5,526,055 | A | | 6/1996 | Zhang et al. | ................ 348/510 |
| 5,874,846 | A | | 2/1999 | Lee | ............................ 327/299 |
| 5,896,422 | A | * | 4/1999 | Lu | ............................... 375/317 |
| 5,912,922 | A | * | 6/1999 | Koszarsky et al. | ......... 375/224 |
| 5,966,184 | A | * | 10/1999 | Boehlke | ..................... 348/524 |
| 6,137,536 | A | * | 10/2000 | Yamaguchi | ................. 348/521 |
| 6,532,042 | B1 | * | 3/2003 | Kim | ............................ 348/537 |
| 6,753,926 | B1 | * | 6/2004 | Nishino | ...................... 348/537 |

* cited by examiner

*Primary Examiner*—Brian Yenke
*Assistant Examiner*—Jean W. Désir
(74) *Attorney, Agent, or Firm*—Madson & Metcalf

(57) ABSTRACT

A clock generating apparatus is provided for producing an output clock signal responsive to a source clock signal with a source frequency and a reference clock signal with a reference frequency. The clock generating apparatus includes a counting sequence generator, a measuring value generator and a ratio counter. The counting sequence generator is used for outputting a series of counting values in response to a triggering signal with a specified period determined by the source frequency of the source clock signal and a predetermined counting value. The measuring value generator generates a measuring value by operating the series of counting values according to a predetermined formula. The ratio counter produces the output clock signal with a frequency determined by the source frequency of the source clock signal and the measuring value.

21 Claims, 4 Drawing Sheets

APPARATUS AND METHOD FOR GENERATING CLOCK SIGNAL

FIELD OF THE INVENTION

The present invention relates to an apparatus and a method for generating clock signals, and more particularly to an apparatus and a method for generating clock signals for use with a TV encoder in a display adapter.

BACKGROUND OF THE INVENTION

Nowadays, many electrical appliances are widely used with computers due to the amazing power of computers. For example, video compact disks (VCDs) and digital versatile disks (DVDs) are able to be played by a personal computer. Since the size of a typical computer monitor is not large enough to exhibit the spectacular video effect of the VCD or DVD disks, it is preferred that the signals be outputted from the personal computer to a TV set to be displayed on the relatively large TV screen. The purpose can be achieved by employing a display adapter.

FIG. 1(a) is a partial functional block diagram of a typical display adapter. The pixel parallel digital signals from a graphic chip 10 are selectively converted into a proper format of analog signals via either a random access memory digital-to-analog converter (RAM DAC) 11 or a TV encoder 12, and delivered to a computer monitor 13 or a TV screen 14, respectively, for display. Further, for TV analog signals, two formats, i.e. the NTSC (National Television Standards Committee) standard and the PAL (Phase Alternate Line) standard, are involved.

The functional block diagram of the TV encoder 12 can be seen in FIG. 1(b). The pixel parallel digital signals from the graphic chip 10 is processed by a data capture device 121, a color space converter 122, a scalar and deflicker 123, an NTSC/PAL encoder 124 and a digital-to-analog converter 125 to produce the TV analog signals either in the NTSC or PAL standard. The pixel clock required to operate the NTSC/PAL encoder 124 is produced from a phase-locked loop clock generator 126. In order to synchronize the pixel clock with the system clock required to operate the graphic chip 10, the pixel clock is generated in response to the system clock. In such way, a possible frequency drift of the system clock will also result in a frequency drift of the pixel clock. In general, the system clock for operating the graphic chip 10 permits a larger tolerance than the pixel clock. If the acceptable frequency drift of the system clock results in the corresponding frequency drift of the pixel clock, rendering a frequency error beyond the tolerance of the pixel clock, the output TV analog signal from the NTSC/PAL encoder 124 cannot be correctly decoded, and thus no normal picture is shown on the TV screen.

In order to overcome the above-described problem, a clock generator is provided in the NTSC/PAL encoder 124 to compensate the frequency drift effect of the pixel clock, as disclosed in U.S. Pat. No. 5,874,846, which is incorporated herein for reference. Please refer to FIG. 2 which is a circuit block diagram schematically showing the clock generator. The clock generator 300 includes a clock measuring circuit 310 and a P:Q ratio counter 311. The clock measuring circuit 310 operates to output a measuring value Nr, which is provided for the P:Q ratio counter 311 with the original pixel clock of a frequency Fs. The P:Q ratio counter 311 operates to generate the desired compensated pixel clock of a frequency Fo accordingly. The measuring value Nr outputted from the clock measuring circuit 310 is given by:

$$Nr = Ns \times Fr/Fs$$

where Ns is a predetermined counting value, Fs is the frequency of the original pixel clock, and Fr is the frequency of the clock generated by an oscillator inside the TV encoder 12, and wherein Fr is inherently much more accurate than Fs.

The P:Q ratio counter 311 is triggered by the input of the measuring value Nr and the original pixel clock to generate an output clock signal of the frequency Fo, which complies with the demand of the NTSC/PAL encoder 124. The output clock frequency Fo correlates to the original pixel clock frequency Fs by the following equation:

$$Fo = (P/Q) \times Fs$$

where Q is a constant parameter and P=Nr.

In such way, the introduction of the measuring value Nr that varies with the original pixel clock frequency Fs enables a more stable output of the clock frequency Fo from the P:Q ratio counter that is also triggered by the original pixel clock. Since the output clock frequency Fo has stablized, the output TV analog signals from the NTSC/PAL encoder 124 can be correctly decoded. However, the circuit configuration of the above clock generator 300 has some disadvantages. For example, the system 3101 and the reference counter 3013 included in the clock measuring circuit 310 have a phase difference due to the operation of a synchronizing controller 3012 disposed therebetween. The phase difference is generally ranged from 0.5 Tr to 1.0 Tr, where Tr=1/Fr, which adversely effects the stability of the output clock frequency Fo.

SUMMARY OF THE INVENTION

Therefore, the present invention relates to an apparatus and a method for generating clock signals for use with a TV encoder of a display adapter, which provides more stable and accurate output clock signals so as to facilitate the correct decoding of the output TV analog signals.

In accordance with an aspect of the present invention, there is provided a clock generating apparatus for producing an output clock signal responsive to a source clock signal with a source frequency and a reference clock signal with a reference frequency. The clock generating apparatus comprises a counting sequence generator, a measuring value generator and a ratio counter. The counting sequence generator is used for outputting a series of counting values in response to a triggering signal with a specified period determined by the source frequency of the source clock signal and a predetermined counting value. The measuring value generator is electrically connected to the counting sequence generator for generating a measuring value by operating the series of counting values according to a predetermined formula. The ratio counter electrically connected to the measuring value generator, and producing the output clock signal with a frequency determined by the source frequency of the source clock signal and the measuring value.

In an embodiment, the specified period is defined by a ratio of the predetermined counting value to the source frequency of the source clock signal. The counting sequence generator comprises a frequency divider and a counter. The frequency divider operates the predetermined counting value and the source frequency of the source clock signal for producing the triggering signal. The counter is electrically connected to the frequency divider for periodically counting in response to the reference clock signal, and outputting the series of counting values in response to the triggering signal. The frequency divider comprises a down counter for down counting from the predetermined counting value, and a comparator electrically connected to the down counter, and outputting the triggering signal when down counting to zero. Preferably, the counting sequence generator further comprises a first synchronizing circuit between the comparator and the counter in order to synchronize the comparator with the counter.

In an embodiment, the series of counting values include $C_m, C_{m+1}, \ldots, C_{m+k}$, and the predetermined formula is $(C_{m+k}-C_m)/k$, in which k is an integer greater than or equal to 2. When the k is equal to 2, the series of counting values include $C_m$, $C_{m+1}$ and $C_{m+2}$. The measuring value generator comprises a first register, a subtracter, a second register and an average buffer. The first register is electrically connected to the counting sequence generator for receiving and storing the counting value $C_m$ in a first operating cycle, and receiving and storing the counting value $C_{m+1}$ in a second operating cycle next to the first operating cycle. The subtracter is electrically connected to the counting sequence generator and the first register to carry out a first subtraction between the counting value $C_{m+1}$ and the counting value $C_m$ to obtain a first difference $(C_{m+1}-C_m)$ in the first operating cycle, and a second subtraction between the counting value $C_{m+2}$ and the counting value $C_{m+1}$ to obtain a second difference $(C_{m+2}-C_{m+1})$ in the second operating cycle. The second register electrically connected to the subtracter for storing the first difference. The average buffer electrically connected to the subtracter and the second register for averaging the first difference and the second difference in the second operating cycle so as to obtain the measuring value. Preferably, the clock generating apparatus further comprises a second synchronizing circuit between the average buffer and the ratio counter in order to synchronize the average buffer and the ratio counter.

Preferably, the ratio counter is a P:Q ratio counter, in which P equals to the measuring value and Q is a preset coefficient.

In accordance with the present invention, the source clock signal is a pixel clock signal generated by a PLL clock generator, the reference clock signal is generated by an oscillator of a TV encoder of the display adapter, and the output clock signal is a compensated pixel clock signal provided for an NTSC/PAL encoder.

In accordance with another aspect of the present invention, there is provided a method for generating an output clock signal in response to a source clock signal with a source frequency and a reference clock signal with a reference frequency. The method includes steps of: producing a counting value series by counting at intervals of a specified period determined by the source frequency of the source clock signal and a predetermined counting value; generating a measuring value according to the counting value series in response to the reference clock signal; and producing the output clock signal according to the source frequency and the measuring value.

Preferably, the measuring value is defined by a ratio of the difference between a latest counting value and the k-th counting value ahead of the latest counting value to k, and k is greater than or equal to 2.

In an embodiment, the counting value series is produced by steps of: producing a triggering clock signal having a frequency reciprocal to the specified period; and counting in response to the reference clock signal, and outputting the counting value series in response to the triggering clock signal.

In an embodiment, the measuring value is generated by steps of: storing a first counting value of the counting value series; performing a first subtraction to obtain a first difference between a second counting value and the first counting value, the second counting value being produced next to the first counting value; storing the first difference; performing a second subtraction to obtain a second difference between a third counting value and the second counting value, the third counting value being produced next to the second counting value; and averaging the first difference and the second difference to obtain the measuring value.

Preferably, the output clock signal has a frequency defined by multiplying the source frequency of the source clock signal by the measuring value, and then dividing the resulting product by a constant parameter.

In accordance to another aspect of the present invention, there is provided a method for compensating a frequency drift of an output clock signal, wherein the output clock signal is generated in response to a source clock signal with a source frequency and a reference clock signal with a reference frequency. The method comprising steps of sampling the reference clock signal at intervals correlating to the source frequency to obtain a series of sampling values, averaging the series of sampling values according to a first formula to obtain a compensating factor, and incorporating the compensating factor to the source frequency according to a second formula to obtain a compensated frequency of the output clock signal.

In an embodiment, the internals are determined by Ns/Fs, in which Ns is a predetermined counting value, and Fs is the source frequency of the source clock signal.

For example, the first formula is expressed by $Nr=(C_3-C_1)/2$, in which Nr is the compensating factor, $C_1$ is the first one of three consecutive sampling values, and $C_3$ is the last one of the three consecutive sampling values. The second formula is expressed by $Fo=(Nr/Q) \times Fs$, in which Fo is the compensated frequency of the output clock signal, Q is a constant parameter, and Fs is the source frequency of the source clock signal.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1A:
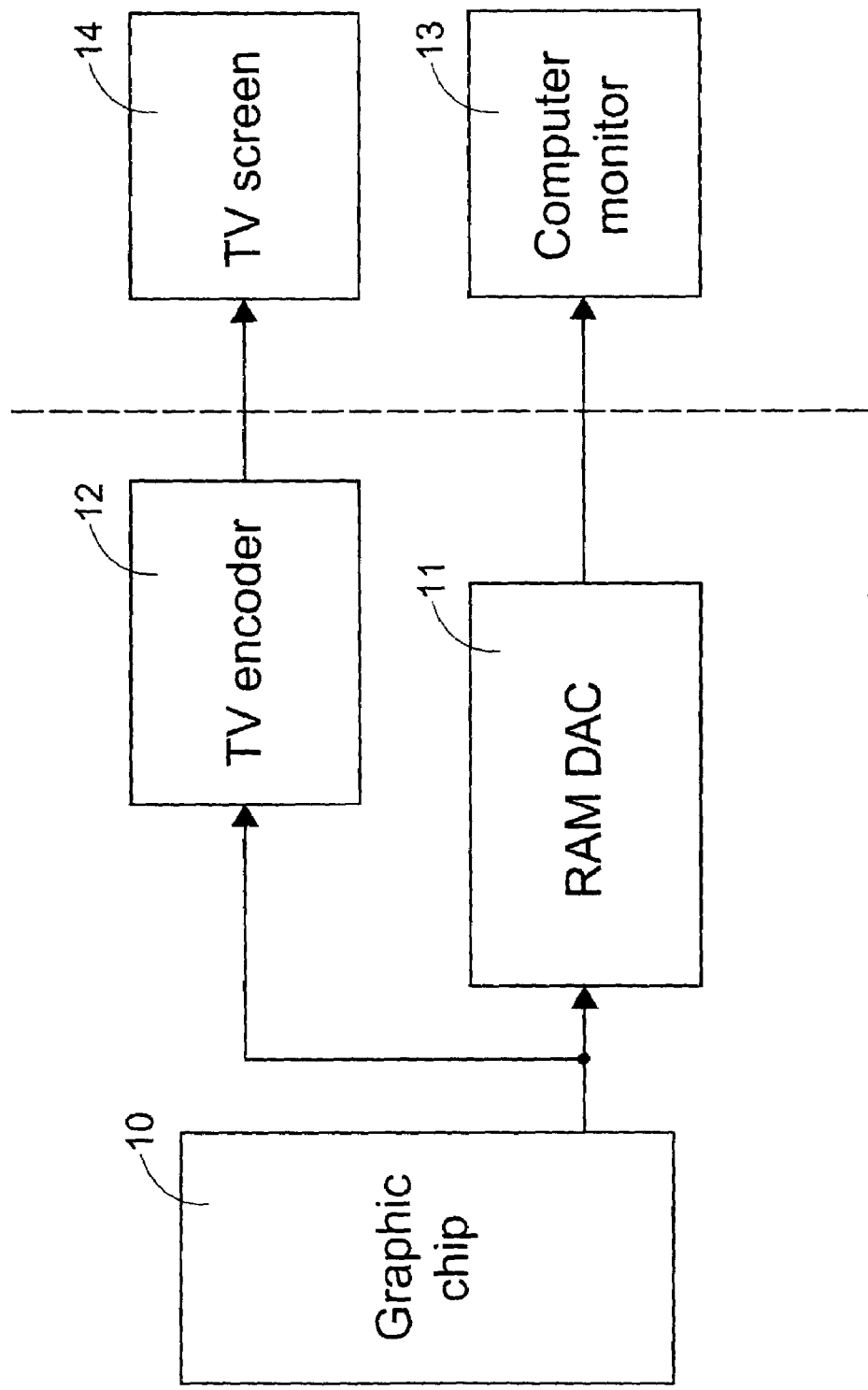
FIG. 1(a) is a partial functional block diagram of a typical display adapter.
Figure 1B:
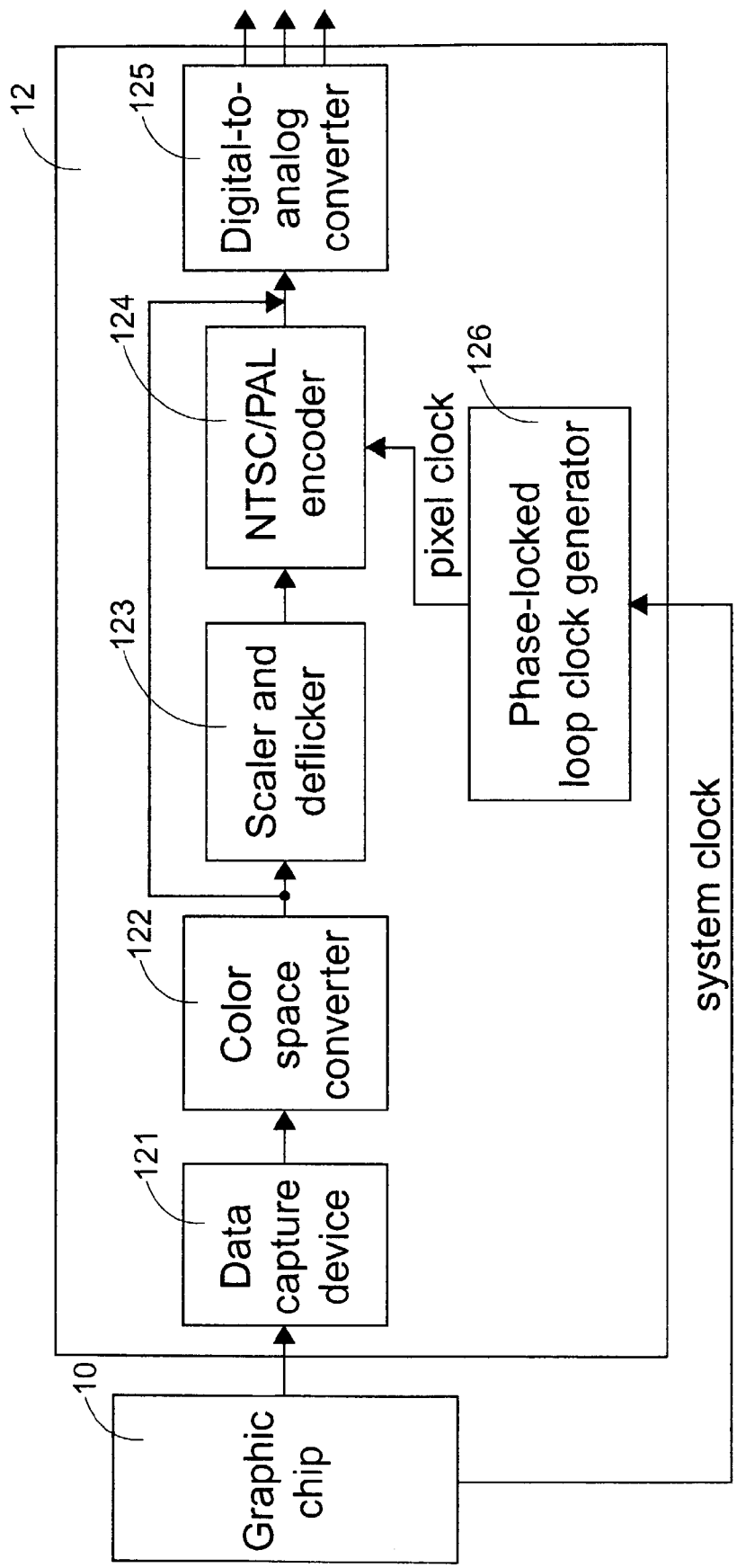
FIG. 1(b) is a functional block diagram of the TV encoder in FIG. 1(a)
Figure 2:
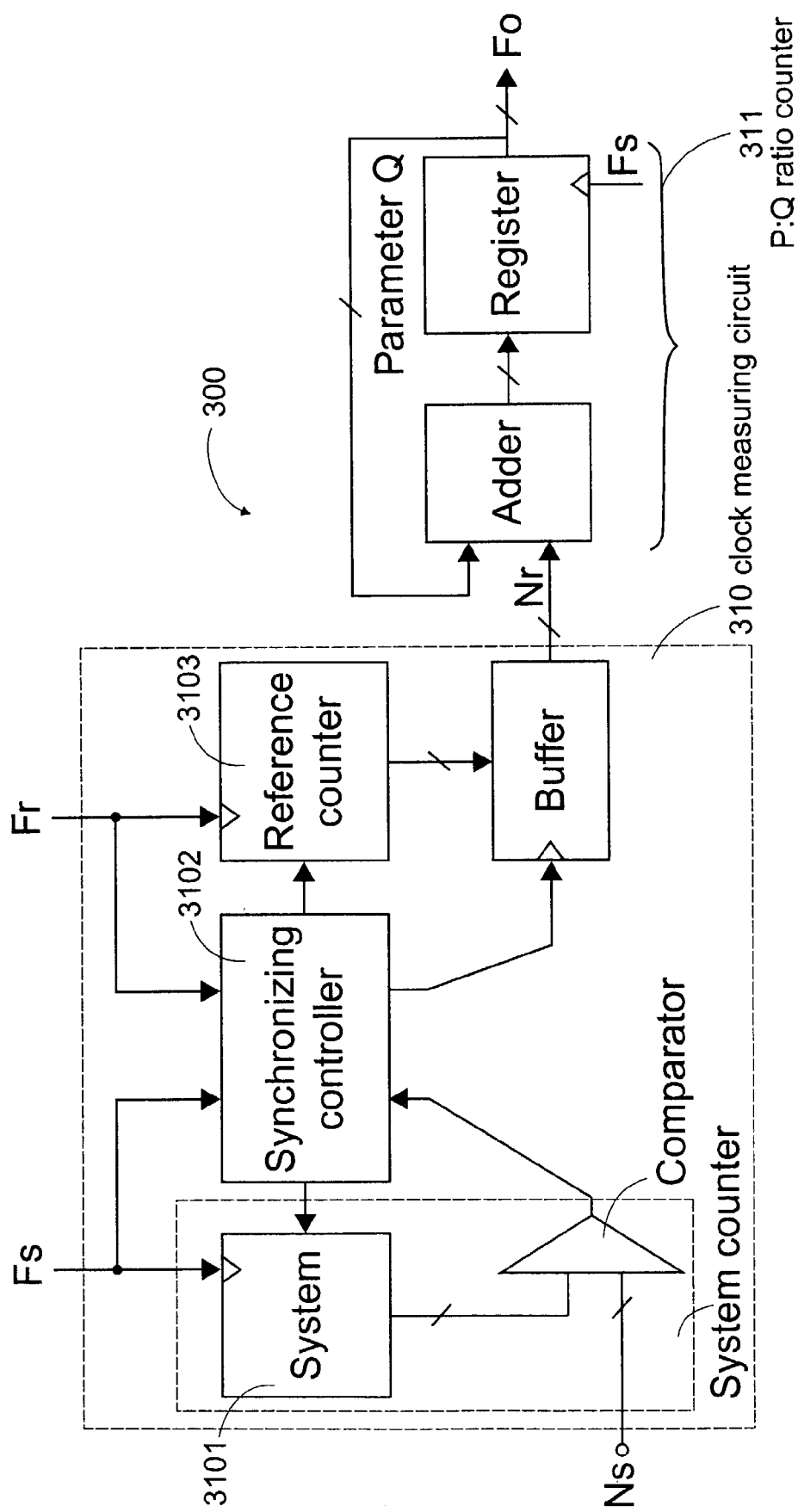
FIG. 2 is a functional block diagram of a clock generator according to prior art.
Figure 3:
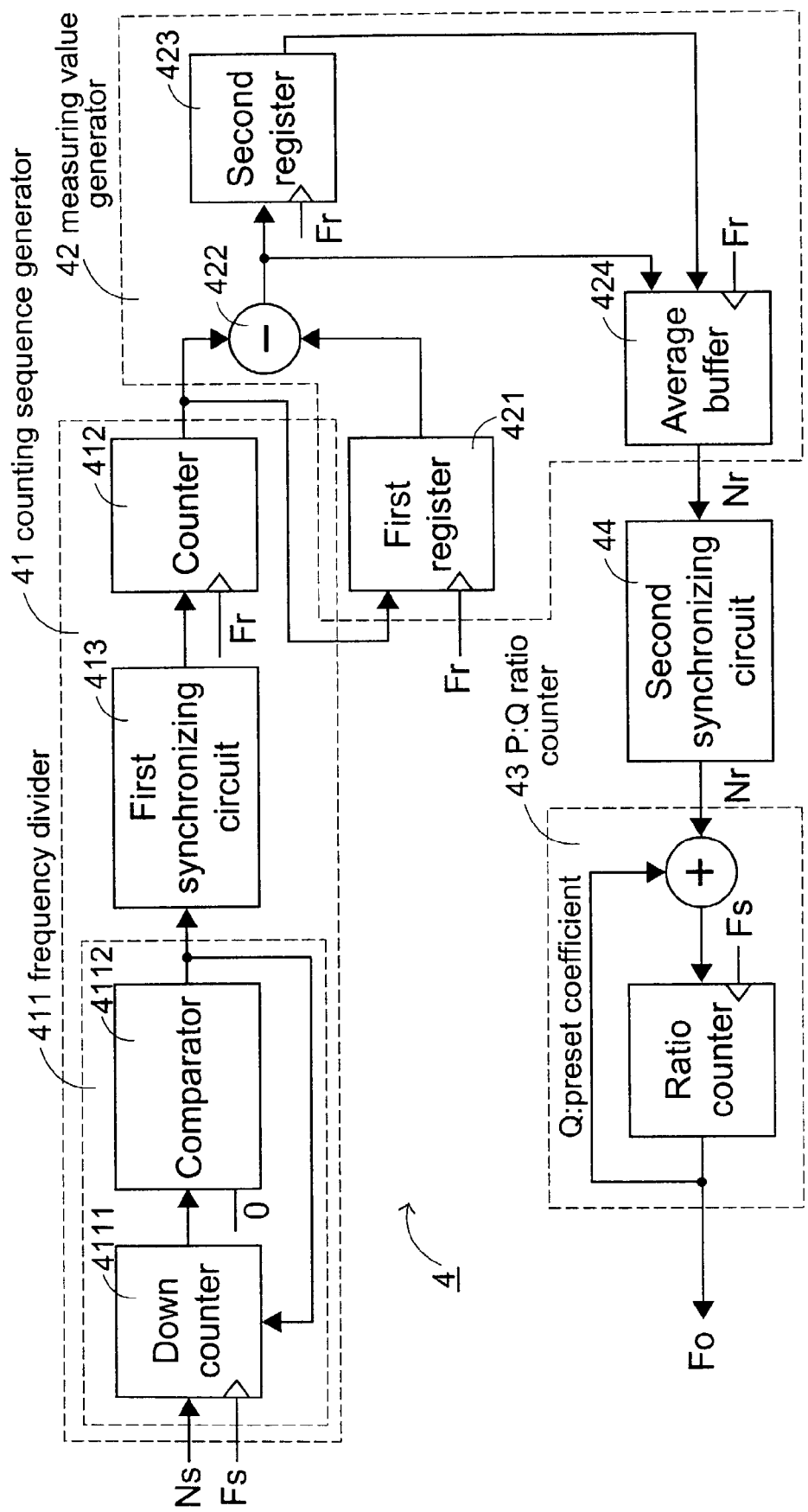
FIG. 3 is a functional block diagram of a clock generating apparatus according to a preferred embodiment of the present invention.

Please refer to FIG. 3. In accordance with the present invention, the clock generating apparatus 4 is employed for producing an output clock signal, i.e. a compensated pixel clock signal, responsive to an original pixel clock signal and a reference clock signal. The original pixel clock signal and the reference clock signal are generated by the phase-locked loop clock generator (FIG. 1(b)) and an oscillator (not shown) of a TV encoder in a display adapter, respectively. The original pixel clock signal, the reference clock signal and the compensated pixel clock signal have a source frequency Fs, a reference frequency Fr and an output frequency Fo, respectively.

The clock generating apparatus 4 of the present invention comprises a counting sequence generator 41, a measuring value generator 42 and a P:Q ratio counter 43.

The counting sequence generator 41 outputs a series of counting values in response to a triggering signal. In accordance with the source frequency Fs and a predetermined counting value Ns, the triggering signal has a specified period determined by Ns/Fs. The counting sequence generator 41 comprises a frequency divider 411 and a counter 412. The frequency divider 411 comprises a down counter 4111 for down counting from the predetermined counting value Ns, and a comparator 4112 electrically connected to the down counter 4111 for outputting the triggering signal when down counting to zero. In such way, the frequency divider 411 operates dependent on the predetermined counting value Ns and the source frequency Fs for producing the triggering signal. The counter 412 is electrically connected to the frequency divider 411 for periodically counting in response to the reference clock signal, and outputting the series of counting values in response to the triggering signal. In addition, the counting sequence generator 41 comprises a first synchronizing circuit 413 between the comparator 4112 and the counter 412 in order to synchronize the comparator 4112 and the counter 412.

The measuring value generator 42 is electrically connected to the counting sequence generator 41, and includes a first register 421, a subtracter 422, a second register 423 and an average buffer 424. The counting sequence generator 41 generates a series of counting values, $C_1, C_2, \ldots, C_m, C_{m+1}, C_{m+2}, \ldots, C_{m+k}$, etc., in which m and k are integers. The first register 421 is electrically connected to the counting sequence generator 41 for sequentially receiving and storing the counting values from the counting sequence generator 41. The subtracter 422 is electrically connected to the counting sequence generator 41 and the first register 421 for receiving and operating counting values from the counting sequence generator 41 and the first register 421, respectively. The second register 423 is electrically connected to the subtracter 422 for receiving and storing the output of the subtracter 422. The average buffer 424 is electrically connected to the subtracter 422 and the second register 423 for averaging the outputs of the subtracter 422 and the second register 423. For example, in a first operating cycle, a counting value $C_m$ is outputted from the counting sequence generator 41 to the first register 421, and the counting sequence generator 41 generates a new counting value $C_{m+1}$. Therefore, the subtracter 422 carries out a first subtraction between the counting value $C_{m+1}$ and the counting value $C_m$ to realize a first difference $(C_{m+1}-C_m)$. Afterwards, the subtracter 422 outputs the first difference to the second register 423, and performs a second subtraction between a counting value $C_{m+2}$ newly generated by the counting sequence generator 41 and the counting value $C_{m+1}$ outputted to the first register 421 in a second operating cycle next to the first operating cycle to realize a second difference $(C_{m+2}-C_{m+1})$. The average buffer 424 receives the outputs $(C_{m+2}-C_{m+1})$ and $(C_{m+1}-C_m)$ from the subtracter 422 and the second register 423, respectively, to average the first difference $(C_{m+1}-C_m)$ and the second difference $(C_{m+2}-C_{m+1})$ so as to obtain a measuring value Nr, i.e. $(C_{m+2}-C_m)/2$. It is understood that in an embodiment providing more registers and operating units, the counting values can be even multiply operated to obtain a finer result. A general formula $(C_{m+k}-C_m)/k$ can be employed to obtain the measuring value Nr.

Then the P:Q ratio counter 43 electrically connected to the measuring value generator 42, wherein P equals to the measuring value Nr and Q is a preset coefficient, executes a formula Fo=(Nr/Q)×Fs to obtain the output frequency Fo of the output clock signal.

In order to synchronize the average buffer 424 and the P:Q ratio counter 43, a second synchronizing circuit 44 is further provided between the average buffer 424 and the P:Q ratio counter 43.

Since the reference clock signal is generated by an oscillator of a TV encoder in a display adapter, the reference frequency Fr is much more accurate than the original pixel clock frequency Fs. Furthermore, when comparing with prior art, the sampling range of the measuring value Nr is wider according to the present invention. In other words, the phase differences of the output clock signals are averaged to perform a better modification so as to provide more stable and accurate output clock signals. It is to be noted that the present invention, although illustrated with reference to a TV encoder of a PC display adapter, can be applied to any other analogous circuit architecture where a frequency drift of an output clock signal is to be compensated by adjusting a relatively unstable source clock signal in response to a relatively stable reference clock signal.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A clock generating apparatus for producing an output clock signal responsive to a source clock signal with a source frequency and a reference clock signal with a reference frequency, said clock generating apparatus comprising:
   a counting sequence generator outputting a series of counting values in response to a triggering signal with a specified period determined by said source frequency of said source clock signal and a predetermined counting value, said series of counting values including $C_m$, $C_{m+1}, \ldots, C_{m+k}$, where k is an integer greater than or equal to 2;
   a measuring value generator electrically connected to said counting sequence generator, and generating a measuring value by operating said series of counting values according to a predetermined formula $(C_{m+k}-C_m)/k$; and
   a ratio counter electrically connected to said measuring value generator, and producing said output clock signal with a frequency determined by said source frequency of said source clock signal and said measuring value.

2. The clock generating apparatus according to claim 1 wherein said specified period is defined by a ratio of said predetermined counting value to said source frequency of said source clock signal.

3. The clock generating apparatus according to claim 2 wherein said counting sequence generator compnses:
   a frequency divider operating said predetermined counting value and said source frequency of said source clock signal for producing said triggering signal; and
   a counter electrically connected to said frequency divider, periodically counting in response to said reference clock signal, and outputting said series of counting values in response to said triggering signal.

4. The clock generating apparatus according to claim 3 wherein said frequency divider comprises:
a down counter for down counting from said predetermined counting value; and
a comparator electrically connected to said down counter, and outputting said triggering signal when down counting to zero.

5. The clock generating apparatus according to claim 4 wherein said counting sequence generator further comprises a first synchronizing circuit between said comparator and said counter in order to synchronize said comparator with said counter.

6. The clock generating apparatus according to claim 1 wherein said k is equal to 2, and said series of counting values include $C_m$, $C_{m+1}$ and $C_{m+2}$.

7. The clock generating apparatus according to claim 6 wherein said measuring value generator comprises:
a first register electrically connected to said counting sequence generator for receiving and storing said counting value $C_m$ in a first operating cycle, and receiving and storing said counting value $C_{m+1}$ in a second operating cycle next to said first operating cycle;
a subtracter electrically connected to said counting sequence generator and said first register to carry out a first subtraction between said counting value $C_{m+1}$ and said counting value $C_m$ to obtain a first difference ($C_{m+1}-C_m$) in said first operating cycle, and a second subtraction between said counting value $C_{m+2}$ and said counting value $C_{m+1}$ to obtain a second difference ($C_{m+2}-C_{m+1}$) in said second operating cycle;
a second register electrically connected to said subtracter for storing said first difference; and
an average buffer electrically connected to said subtracter and said second register for averaging said first difference and said second difference so as to obtain said measuring value.

8. The clock generating apparatus according to claim 7 further comprising a second synchronizing circuit between said average buffer and said ratio counter in order to synchronize said average buffer and said ratio counter.

9. The clock generating apparatus according to claim 1 wherein said ratio counter is a P:Q ratio counter, in which P equals to said measuring value and Q is a preset coefficient.

10. The clock generating apparatus according to claim 1 wherein said source clock signal is an original pixel clock signal provided by a phase-locked loop clock generator, said reference clock signal is generated by an oscillator of a TV encoder of said display adapter, and said output clock signal is a desired compensated pixel clock signal provided for an NTSC/PAL encoder.

11. A method for generating an output clock signal in response to a source clock signal with a source frequency and a reference clock signal with a reference frequency, comprising steps of:
producing a counting value series by counting at intervals of a specified period determined by said source frequency of said source clock signal and a predetermined counting value;
generating a measuring value according to said counting value series in response to said reference clock signal, wherein said measuring value is defined by a ratio of the difference between a latest counting value and the k-th counting value ahead of said latest counting value to k, and k is greater than or equal to 2; and
producing said output clock signal according to said source frequency and said measuring value.

12. The method according to claim 11 wherein said counting value series is produced by steps of:
producing a triggering clock signal having a frequency reciprocal to said specified period; and
counting in response to said reference clock signal, and outputting said counting value series in response to said triggering clock signal.

13. The method according to claim 12 wherein said triggering clock signal is produced by completing a down-counting operation from said predetermined counting value to zero.

14. The method according to claim 11 wherein k is equal to 2, and said measuring value is generated by steps of:
storing a first counting value of said counting value series;
performing a first subtraction to obtain a first difference between a second counting value and said first counting value, said second counting value being produced next to said first counting value;
storing said first difference;
performing a second subtraction to obtain a second difference between a third counting value and said second counting value, said third counting value being produced next to said second counting value; and
averaging said first difference and said second difference to obtain said measuring value.

15. The method according to claim 11 wherein said output clock signal has a frequency defined by multiplying said source frequency of said source clock signal by said measuring value, and then dividing the resulting product by a constant parameter.

16. The method according to claim 11 wherein said source clock signal is a pixel clock signal generated from a phase-locked-loop clock generator of a TV encoder in response to a system clock signal from a graphic chip.

17. The method according to claim 16 wherein said reference clock signal is generated by a built-in oscillator of said TV encoder.

18. A method for compensating a frequency drift of an output clock signal, said output clock signal being generated in response to a source clock signal with a source frequency and a reference clock signal with a reference frequency, said method comprising steps of:
sampling said reference clock signal at intervals correlating to said source frequency to obtain a series of sampling values;
averaging said series of sampling values according to a first formula to obtain a compensating factor; and
incorporating said compensating factor to said source frequency according to a second formula to obtain a compensated frequency of said output clock signal.

19. The method according to claim 18 wherein said internals are determined by Ns/Fs, in which Ns is a predetermined counting value, and Fs is said source frequency of said source clock signal.

20. The method according to claim 18 wherein said first formula is expressed by $Nr=(C_3-C_1)/2$, in which Nr is said compensating factor, $C_1$ is the first one of three consecutive sampling values, and $C_3$ is the last one of the three consecutive sampling values.

21. The method according to claim 20 wherein said second formula is expressed by $Fo=(Nr/Q) \times Fs$, in which Fo is said compensated frequency of said output clock signal, Q is a constant parameter, and Fs is said source frequency of said source clock signal.

* * * * *